Dec. 14, 1937.    T. A. WETTIG    2,101,926
RAIL CHUCK FOR MACHINE TOOLS
Filed May 22, 1936    2 Sheets-Sheet 1

INVENTOR.
THEODORE A. WETTIG.
BY
Allen & Allen
ATTORNEYS.

Dec. 14, 1937.　　　　T. A. WETTIG　　　　2,101,926
RAIL CHUCK FOR MACHINE TOOLS
Filed May 22, 1936　　　　2 Sheets-Sheet 2

INVENTOR.
THEODORE A. WETTIG.
BY　Allen & Allen
ATTORNEYS.

Patented Dec. 14, 1937

2,101,926

UNITED STATES PATENT OFFICE 2,101,926

RAIL CHUCK FOR MACHINE TOOLS

Theodore A. Wettig, Cincinnati, Ohio

Application May 22, 1936, Serial No. 81,274

6 Claims. (Cl. 279—116)

My invention relates to rail chucks for locating two members of work adjacent, one to the other, and in true relation to the machine tool.

In the art, it is old and well-known to provide chucks with scrolls engaging the jaws. These scrolls rotate and move the jaws in a radial direction across the face of the chuck, and may be operated either by pinions or other mechanical arrangements.

In three-jaw chucks it is common practice to make the scroll either closely fitting upon or in the chuck body, or to have the scroll engage only the jaws, being otherwise loose within the chuck body. In combinations in which the scroll engages the jaws and is free to move with respect to the chuck body, it is commonly called a floating scroll chuck. To the best of my knowledge and belief, a floating scroll chuck has not been made in which two clamping jaws are operated by the floating scroll, and it is one of my objects to provide such a chuck.

It has been the usual practice in previous designs of rail chucks to have a plurality of screws engaging one piece of the work to press it against the rail, and to have another set of screws engaging the second piece of work to press and clamp it against the first piece of work. Such chucks have not been satisfactory for true precision work primarily because of the inability of the chucks, work or rails to hold a true alignment and withstand the pressures necessarily exerted by the screws.

It is my object, as will be exemplified in the chuck herein described, to provide a screw which initially clamps one portion of the work against the rails. This screw need not be tightened to such an extent as to distort the work, the chuck or the alignment of the rails. It is my object to so control the movement of the other jaw that when the two jaws are operated, one towards the other by the scroll, said jaws tighten themselves upon the work, and hold the work together as if the work were one, unitary piece. The tooling operation may then be carried out with precision.

Broadly, it is my object to provide a suitable rail chuck for accurately locating two pieces of work rigidly with respect to each other and to the machine so that precision work may be carried out.

The above objects and other objects to which reference will be made in the ensuing description, I accomplish by that certain combination and arrangement of parts of which I have depicted a preferred, typical construction so as to enable others schooled in the art to fully apprehend the underlying features of my invention in the various ways contemplated thereby.

Referring to the drawings:—

Figure 1:
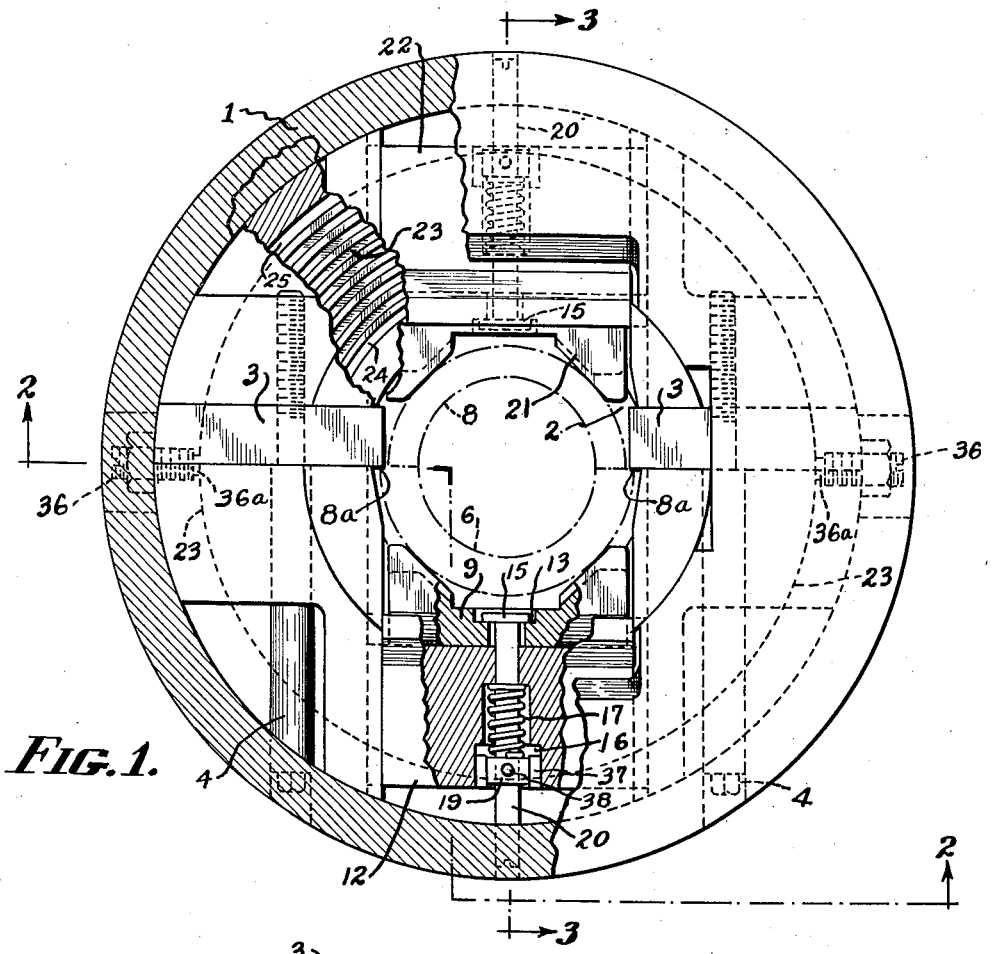
Fig. 1 is a front elevation of a preferred, typical construction, portions of the body being cut away to reveal the inner construction of the chuck.
Figure 2:
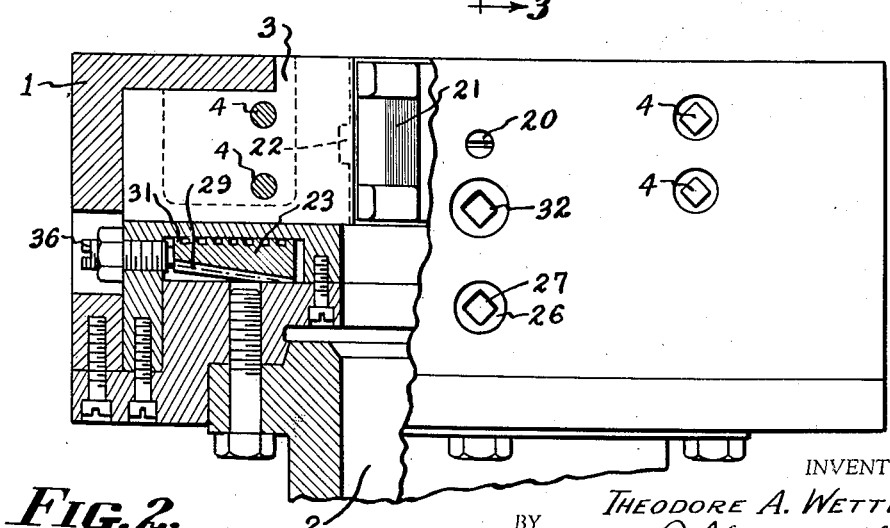
Fig. 2 is a sectional view taken along the lines 2, 2 of Fig. 1.

The body of the chuck which, in this instance, is circular, is generally indicated at 1. A central orifice 2 extends through the chuck body so that the work to be tooled may extend through the chuck.

Rails 3, which are removable, are secured within the shell by means of bolts 4, which secure the rails in a fixed position.

Master jaws 12 and 22 are slidably mounted in the body 1 so that they can be moved toward and from each other. The slip jaws 9 and 21 have convex external surfaces which engage the concave surfaces of the master jaws 12 and 22. The concave surfaces of the master jaws are formed with the centers arranged at right angles to the jaws so that the slip jaws 9 and 21 can rock or slide, within reasonable limits, about the center line in one plane. The slip jaws 9 and 21 have on their inner or work engaging surfaces a series of V-shapes or angular surfaces of such construction that they lie in equal planes on the outer edges of the V, and are separated by the clearance of the V arms.

The slip jaws are held against their respective master jaws by the T heads 15 of rods 20. The T heads engage the recessed shoulders 13 of slots 13a, which extend through the jaws. Resilient spiral springs 17 are positioned in internal bores 18 in the master jaws. The springs abut collars 19 pinned to the rods 20 in such a manner that the slip jaws are resiliently held within the master jaws. Further detail of this construction will be described later.

The master jaw and scroll construction illustrated, which is familiar to those skilled in this art, consists in teeth 30 formed in the master jaws which are engaged by the scroll threads 31. The scroll is rotated by a pinion 26, having beveled gear teeth 28 which engage the beveled gear teeth 29 formed on the inner peripheral surface of the scroll. The pinion 26 has socket wrench receiving portions 27. Clearance spaces 24 and 25 permit the scroll to be free floating as desirable.

Figure 3:
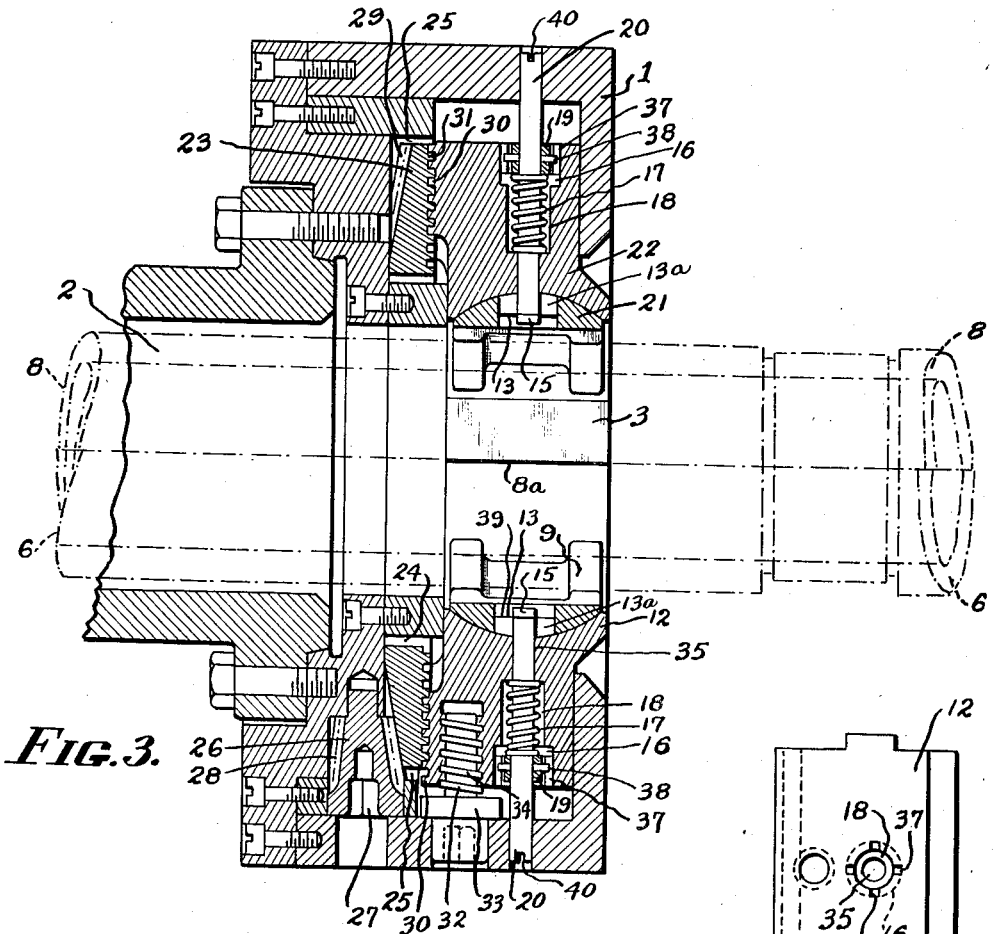
Fig. 3 is a sectional view taken along the lines 3, 3 in Fig. 1.

Referring to Fig. 3, it will be observed that one of the master jaws 12 has an internally threaded portion which is engaged by the external threads 34 of the screw 32. It will be further noted that this screw and the master jaw 12 are located on the side of the chuck opposite to the face or corners 8a of the rails, and that the head portion 33 of the screw 32 engages the internal shoulder of the recess in the body 1, so that rotation of the screw causes movement of the master and slip jaws 12, 9.

The two master jaws 12 and 22 are separated from each other in a relative position by the scroll 23, which engages these jaws. The slip jaws 9 and 21 are secured to their respective master jaws 12 and 22 in such a manner that the opening 2 in the chuck is unobstructed so as to allow work to pass between the jaws and through the chuck body.

In chucking the work, one segment 6 is placed within the chuck and the screw 32 is rotated so as to force the slip jaw 9 against segment 6, which, in turn, is clamped against the rails 3 at the corner edges 8a. Due to the rocking action between the master jaws and the slip jaws, it necessarily follows that the outer edges of the slip jaws will engage the segment in such a manner as to clamp it with a balanced pressure against the corners 8a.

The segment 6 is substantially free to rotate slightly in a plane parallel to the edges 8 of the rails until arrested by any one of the four angular surfaces of the slip jaw 9.

The second segment 8 of the work is now placed between the slip jaw 21 and the first segment 6 so that portions of the second segment engage portions of the first segment, said engagement taking place in the plane of the clamping surfaces of the rails.

The pinion 26 is then rotated. The advance of the scroll brings the slip jaw 21 against the second segment to secure the second segment against the first segment. It will be observed that the scroll engages both master jaws and absorbs the force which joins the first segment to the second segment, and that there is no interengagement between the second jaw and the chuck other than the sliding surface engagement which keeps it in its relative position. During the clamping action the scroll is free to float parallel to the direction of clamping action. Therefore while the scroll is not entirely free floating it is a cross sliding scroll restrained to movement parallel with the direction of clamping action.

Referring to the drawings, it will be observed that one piece of the work is made of such a shape that it engages the rails of the chuck. The other piece of work is made of such shape that it passes between the rails of the chuck and engages or seats itself against the first named piece. With this arrangement, machining of the exterior surfaces, upon which the jaws seat, is unnecessary. However, since a high degree of precision is desired, it is preferable to machine the surface of the first piece which engages the rails and the surface of the second piece which engages the first piece, as it is obvious that in any chuck a certain degree of accuracy depends upon the condition of the work to be chucked.

It is common practice in the design of scrolls of the pinion-operated type to have a circular hole within the scroll and a cylindrical surface at the periphery. It is also common practice to have the cavity into which this scroll is lodged also of a circular section. It will readily be observed that in a floating scroll chuck made along lines of the usual design that there would be a space 25 between the scroll and the body which would be variable as the scroll may be forced about in the cavity of the body.

The rotation of the pinion 26, when its teeth 29 engage the teeth on the back of the scroll, creates a stress which has a tendency to move the scroll in a path at right angles to the desired travel of the jaws, and to bind the scroll teeth 30 in such a manner as to retard the proper action of the scroll. To overcome this, I have inserted members such as screws 36, having wear surfaces 36a, on each side of the scroll, to arrest this undesirable travel and to overcome the binding action.

Figure 5:
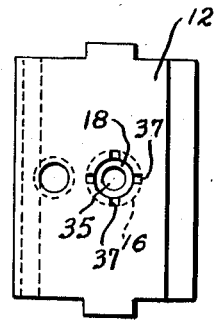
Fig. 5 is a bottom plan view of one of the master jaws.
Figure 6:
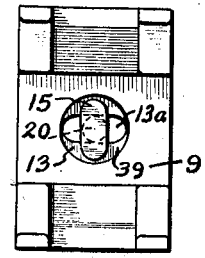
Fig. 6 is a plan view of the lower slip jaw with the T head in holding position.
Figure 4:
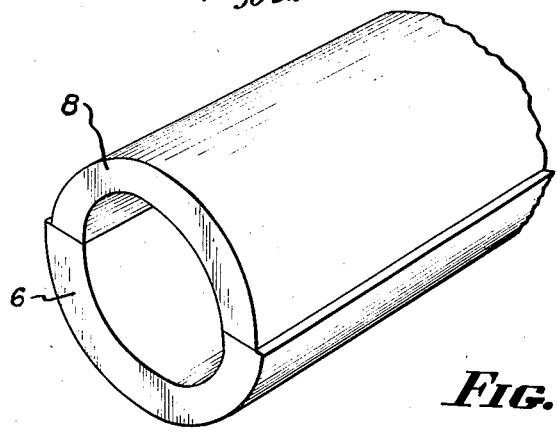
Fig. 4 is a perspective view showing a combination of segmental pieces of work, such as may be conveniently clamped in my chuck prior to a tooling operation.

The connection between the slip jaws and the master jaws is shown in detail in Figs. 5 and 6. The master jaw 12 is shown in Fig. 5 disconnected from the chuck. The opening 35 is the internal bore which extends through the master jaw and through which the bolt 20 extends with a snug fit. The annular opening 18 is the enlarged bore within which the spring 17 is housed. The annular recess 16 is indicated in dotted lines. Slots 37 extend down through the walls of the jaw to the annular recess. The rod 20 has pins 38, which, with a quarter turn, will seat within the slots 37 and permit the pins to enter the recess 16 and take up the tension of the spring 17, thereby releasing the tension of the T heads against the counterbored shoulder in the slip jaw 9.

Referring now to Fig. 6, the slip jaw has an elliptical recess 13a, through which the T head 15 of the bolt 20 may be extended. A counterbore 39 provides a shoulder 13 against which the head 15 of the bolt abuts. The elliptical recess permits the passage of the T head which, when turned at right angles, seats against the shoulder as indicated. By inserting a screw driver in the slot 40 of the bolt 20, the pins 38 may be forced down in the slots 37. Further turning of the bolt will cause registry of the T head 15 in the elliptical slot 13a in the slip jaw so that the slip jaw may be detached from assembly with the master jaw. This provides for attachment of slip jaws particularly designed to fit certain types of work.

The construction of the slip jaws and the mounting therefor forms an important feature of my invention.

Having thus described my invention, what I claim as new and desire to secure by Letters Patent, is:

1. A rail chuck for machine tools for holding a plurality of pieces of work for a tooling operation comprising a body, a plurality of work holding jaws movable in said body, rails mounted in said body towards which one of the said jaws is adjustable for clamping one of the pieces of work, and means for clamping another piece of work against the first noted piece of work, comprising in combination with said work holding jaws a floating scroll.

2. A chuck for machine tools for holding a plurality of pieces of work for a tooling operation comprising a body, a plurality of work holding jaws movable in said body, rails mounted in said body towards which one of the said jaws is adjustable for clamping one of the pieces of work, and means for clamping another piece of work against the first noted piece of work after it is clamped, comprising in combination with said work holding jaws a scroll.

3. A chuck for machine tools for holding a plurality of pieces of work for a tooling operation comprising a body, a plurality of work holding jaws movable in said body, rails mounted in said body toward which one of said jaws is adjustable for locating one of the pieces of work, means for clamping another piece of work against the first noted piece of work after it is located comprising in combination with said work holding jaws a scroll free to float in alignment with the direction of engagement of said jaws, and means to prevent misalignment of said scroll in directions traverse to the direction of floating movement.

4. A chuck for machine tools for holding a plurality of pieces of work for a tooling operation comprising a chuck body, two work holding jaws movable in said body, a rail mounted in said body toward which one of said jaws is adjustable for clamping one of the pieces of work, means for clamping another piece of work against the first-noted piece of work after it is clamped comprising in combination with said work holding jaws a floating scroll freely movable in alignment with the direction of engagement of said jaws, and adjustable bearing members to prevent disalignment of said scroll in directions transverse to the direction of floating movement.

5. A chuck for machine tools for holding a plurality of pieces of work for a tooling operation comprising a chuck body, a pair of work holding jaws movable in said body, a rail mounted in said body toward which one of said jaws is adjustable for clamping one of the pieces of work, means for clamping another piece of work against the first noted piece of work after it is clamped, said means comprising in combination with said work holding jaws a rotatable member restrained from movement counter to the direction of clamping engagement, but having a limited free movement in the direction of clamping engagement.

6. A chuck for machine tools for holding a plurality of pieces of work for a tooling operation comprising a chuck body, a pair of work holding jaws movable in said body, a rail mounted in said base toward which one of said jaws is adjustable for clamping one of the pieces of work, means for clamping another piece of work against the first-noted piece of work after it is clamped, said means comprising in combination with said work holding jaws a member restrained from movement counter to the direction of clamping engagement, but having a limited free movement in the direction of clamping engagement, and comprising a scroll.

THEODORE A. WETTIG.